Sept. 22, 1931.  J. B. GROSSWEGE  1,824,048
BRAKE AND POWER INTERLOCK
Filed July 9, 1929
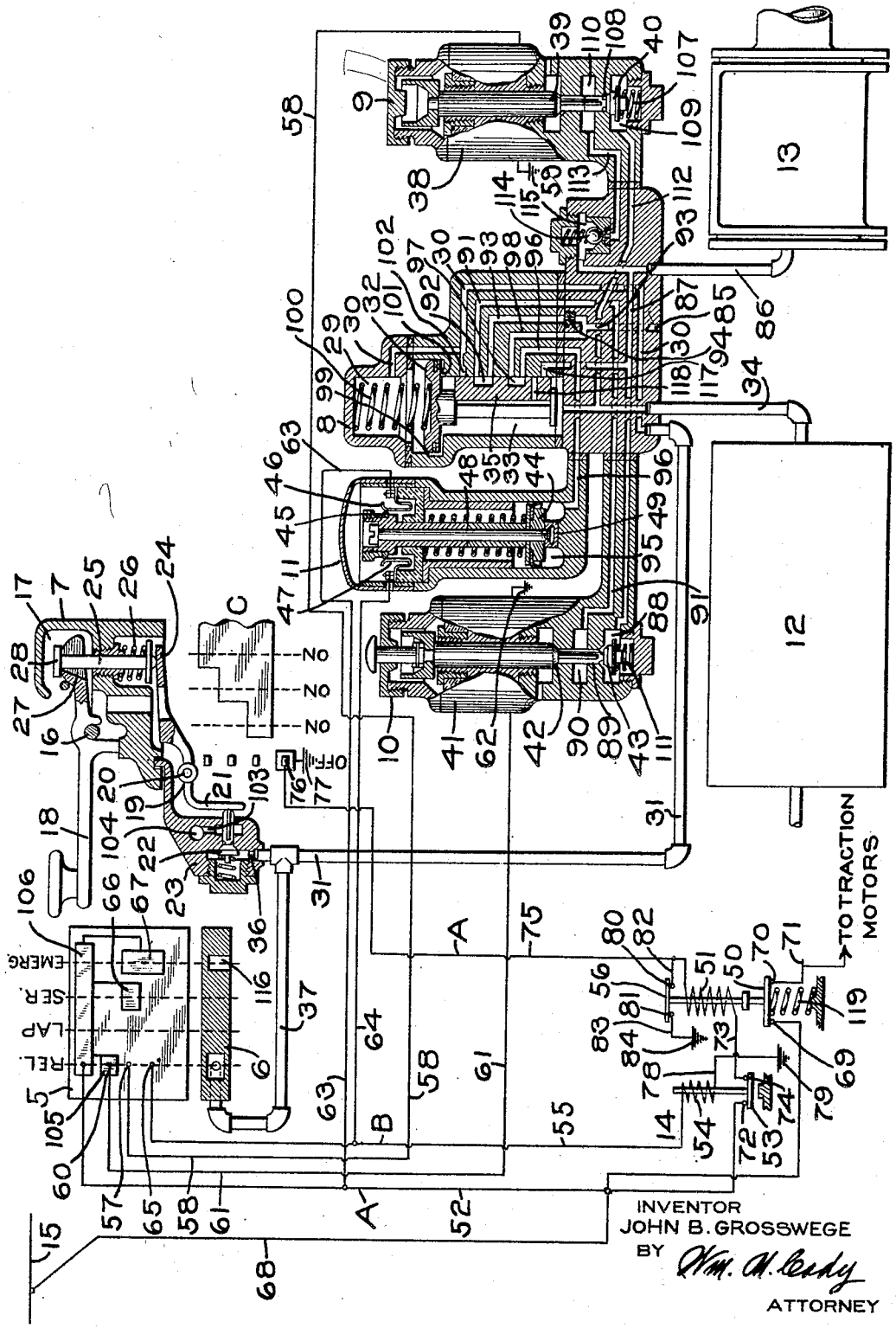
INVENTOR
JOHN B. GROSSWEGE
BY
Wm. A. Cady
ATTORNEY Patented Sept. 22, 1931

1,824,048

UNITED STATES PATENT OFFICE

JOHN B. GROSSWEGE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE AND POWER INTERLOCK

Application filed July 9, 1929. Serial No. 377,092.

This invention relates to safety car equipment and more particularly to a brake and power interlock for electro-pneumatic safety car equipment.

One feature of the safety car equipment is that when an emergency application of the brakes is made when the operator removes his hand from the controller handle when the controller is in "power on" position, the main power circuit is opened so as to cut off power to the traction motors.

The circuit breaker, or line switch for the power circuit is usually installed underneath the car floor, and a pneumatically operated switch device for controlling a secondary circuit of the circuit breaker, is associated with the emergency valve of the equipment, so that when the emergency valve is actuated, the secondary circuit will be broken, thereby operating the circuit breaker to open the main power circuit.

As is well known with the electro-pneumatic safety car equipment, after a dead man's, or controller handle emergency, the emergency valve returns to release position, and the pneumatically operated switch device is also closed.

In one type of control, the equipment is provided with a reset switch which is located in the motorman's compartment, and the main power circuit can not be closed after a dead man's emergency, until the reset switch has been operated in the well known manner.

In another type of control, the cars are not provided with a reset switch, and the present invention relates to this type of equipment.

Heretofore, so far as I am aware of, in the construction of electropneumatic safety car equipment, no means have been provided for preventing the closing of the main power line circuit breaker or line switches when the emergency valve returns to release position after a dead man's or controller handle emergency.

If, after a controller handle emergency, the circuit breaker is closed while the controller is in a "power on" position, power will be supplied to the traction motors.

Therefore, in equipments of this type, it is of advantage to provide means by which the operator must first move the controller handle to "power off" position, before the main power circuit can be closed, after the circuit has been broken by a dead man's or controller handle emergency.

An object of the invention is to provide an improved electropneumatic safety car equipment in which means are provided for preventing the closing of the power circuit after a controller handle emergency until the controller handle is moved to "power off" position.

Another object of the invention is to provide a safety car equipment in which the power circuit is provided with an electrically operated circuit breaker adapted to automatically open the circuit when the controller handle emergency application of the brakes is effected and which can not be actuated to again close the circuit until the controller handle is moved to "power off" position.

Another object of the invention is to provide an improved safety car equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a safety car equipment embodying the invention.

Referring to the drawing, the equipment may comprise a brake valve device 6, an electric controller operating device 7, an emergency valve device 8, a service magnet valve device 9, a release magnet valve devic 10, an interlock switch device 11, a main reservoir 12, a brake cylinder 13, and a main power circuit control device 14. Current for operating the equipment may be supplied from any suitable source, such as a trolley wire 15.

The brake valve device 6 may be of any approved type adapted to control the application and release of the brakes through electrically and pneumatically operated means, and for this purpose the brake valve device is electrically connected with the service magnet valve device 9, the release magnet valve device 10, the interlock switch device 11 and the circuit control device 14, and pneumatically connected with the electric controller operating device 7 and the emergency valve device 8, in the manner to be hereinafter more fully described. Formed as a part of the brake valve device is an electric switch 5 comprising a contact drum, shown developed, and having contacts 66, 67, 105 and 106.

As shown, the electric controller operating device 7 may comprise a handle casing provided with a pocket 17 within which the controller handle 18 is adapted to be inserted. The handle 18 is pivotally mounted on a transversely disposed pin 16 in such a manner as to be easily detached from the controller and applied in position thereon in the usual way.

A bell crank lever 19, pivotally mounted at 20 to the controller C (a portion of which is shown developed), has one arm 21 which is adapted to engage the stem of a pilot valve 22 mounted in a bracket 23, and another arm 24 which is adapted to be engaged by a plunger 25 mounted in the handle casing.

A coil spring 26 acts on the plunger 25 and tends to force the plunger into engagement with the lever arm 24.

The controller handle 18 is provided with a forked end 27, the prongs of which are adapted to engage beneath the head 28 of the plunger 25 when in operating position.

The emergency valve device 8 may comprise a casing having a piston chamber 29 connected through a passage 30 with a control pipe 31 and containing a piston 32 and a valve chamber 33 connected by passage and pipe 34 to the main reservoir 12 and containing a slide valve 35 adapted to be operated by piston 32.

Pipe 31 leads to a chamber 36 in which the pilot valve 22 is contained, and said pipe is connected through a pipe 37 to the brake valve device 6.

The service magnet valve device 9 may comprise a magnet 38 and valves 39 and 40 adapted to be controlled by said magnet. One terminal of the magnet 38 is connected to a terminal contact 57 of the brake valve switch device 5, by a conductor 58, while the other terminal of said magnet is connected to a ground 59.

The release magnet valve device 10 may comprise a magnet 41 and valves 42 and 43 adapted to be controlled by said magnet. One terminal of the magnet 41 is connected to a terminal contact 60 of the brake valve switch device 5, by a conductor 61, while the other terminal of said magnet is connected to a ground 62.

The interlock switch device 11 may comprise a hollow casing containing a piston 44, the stem of which is provided with a contact member 45 for engaging spring fingers 46 and 47, so as to normally close the circuit from the trolley 15 through the control device 14 in the manner to be hereinafter described. A spring 48 acts on one side of the piston 44 so as to normally maintain said piston in its outer position against a stop 49.

The power circuit control device 14 comprises a circuit breaker or line switch member 50, which is controlled by a relay coil 51 in a circuit A, from the brake valve switch 5 to the controller C.

The circuit of the operating coil 51 is controlled by a switch member 53, also in the circuit A. For the purpose of controlling the operation of the switch member 53, a relay coil 54 in a circuit B, is provided.

In order to maintain the circuit breaker operating coil 51 energized, when the controller is in all positions, a switch member 56 is provided. The switch member 56 is connected to the switch member 50 so as to be operated therewith in the manner to be hereinafter more fully described.

*Operation*

With the brake valve device 6 in release position and the controller handle 18 depressed by the operator, as shown in the drawing, current from the trolley wire 15 will be supplied to the circuit A by conductor 68.

Since the switch member 53 will be in engagement with the contacts 72 and 74, due to the fact that relay coil 54 in the circuit B is energized, the circuit A will be closed and current will pass through the circuit breaker operating coil 51 to the ground 77, thereby energizing said coil.

Current supplied to the circuit A from the trolley wire 15 will also pass through the contact members 106 and 105 of the brake valve switch 5, and from thence through the conductor 61 to the magnet 41 of the release magnet valve device 10, and to the ground 62, thereby energizing the release magnet. However as the terminal contact 57 will be separated from the contact 66, magnet 38 will not be energized.

Operating coil 51 being energized, the switch member 50 will be in engagement with the contacts 69 and 70, thereby closing the circuit from the trolley wire 15, through conductors 68 and 71 to the traction motors. Switch member 56 will also be in engagement with the contacts 80 and 81 thereby completing the circuit from the conductor 75 through conductors 82 and 83 to ground 84.

Magnet 41 being energized, the valve 42 will be held seated and valve 43 will be unseated, so that the brake cylinder 13 will be connected to exhaust port 85, through pipe and passage 86, passage 87, valve chamber 88, bore 89 containing the fluted stem of valve 43, chamber 90, passage 91, cavity 92 in the slide valve 35, and passage 93 containing a choke plug 94.

With the piston 32 of the emergency valve device 8 in release position, as shown, piston chamber 95 of the interlock switch device 11 will also be connected to the exhaust port 85, through passage 96, cavity 97 in the slide valve 35, and passages 98 and 93.

The valve chamber 33 of the emergency valve device 8 is charged from the reservoir 12, through pipe and passage 34, and the fluid supplied to piston chamber 29 is maintained at the same pressure by the usual feed groove 99. The pressures on opposite sides of piston 32 being equal, the spring 100 maintains the piston in engagement with stop 101. Fluid under pressure will also be supplied from the piston chamber 29 through passage 30 and pipe 31, to the pilot valve chamber 36, and from pipe 31 through pipe 37 to the brake valve device 6. As long as the controller handle 18 is manually held depressed, as shown in the drawing, the pilot valve 22 will be maintained seated by its spring, and the fluid under pressure will be bottled up in chamber 36.

Magnet 38 of the service magnet valve device 9 being deenergized, the spring 107, acting on the valve 40, seats said valve and unseats the valve 39, thereby cutting off the communication through bore 108 from chamber 109 to chamber 110.

When a service application of the brakes is made, the contact 105 of the brake valve switch 5, is disconnected from the terminal contact 60, thereby opening the circuit from the source of supply to the magnet 41 of the release magnet valve device 10. The magnet 41 will therefore be deenergized.

On the other hand, terminal contact 57 will be connected with the contact 66, thereby closing the circuit from the source of supply to the magnet 38 of the service magnet valve device 9, and therefore magnet 38 will be energized.

Deenergization of the magnet 41 permits the spring 111 to shift the valve 43 to its seat, thereby unseating the valve 42. With the valve 43 seated, the communication through which the brake cylinder 13 is vented to the atmosphere through the exhaust port 85, is cut off.

Energization of the magnet 38 seats the valve 39 and unseats the valve 40, and the fluid under pressure is permitted to flow from the reservoir 12, through pipe and passage 34, passage 112, chamber 109, past the open valve 40, and through bore 108, to chamber 110, and from thence to the brake cylinder 13, through passage 113, past ball check valve 114 in chamber 115, and passage and pipe 86.

When the desired pressure has been obtained in the brake cylinder, the brake valve device is moved to lap position, in which the terminal contact 57 is disconnected from the contact 66, thereby opening the circuit through which current is supplied to the magnet 38, so that the service magnet is deenergized. The spring 107, acting on the valve 40, seats said valve and unseats the valve 39, thus preventing the further supply of fluid under pressure to the brake cylinder 13. The release magnet 41 remains deenergized in lap position, so that fluid under pressure is prevented from being vented to the atmosphere.

When it is desired to release the brakes, the brake valve device is moved to release position, in which the contact 105 is brought into engagement with the terminal contact 60, thereby closing the circuit from the source of supply to the release magnet 41, and causing the energization of said magnet.

Magnet 41 being energized, the valve 42 will be seated and the valve 43 unseated, as shown in the drawing. The fluid under pressure will therefore exhaust to the atmosphere, through pipe and passage 86, passage 87, valve chamber 88, past unseated valve 43, and thence through bore 89, chamber 90, passage 91, cavity 92 in the slide valve 35, passage 93, and exhaust port 85, the choke plug 94 in passage 93 controlling the rate of blow down of the fluid from the brake cylinder, as will be readily understood.

When it is desired to effect an emergency application of the brakes, the brake valve device is moved to emergency position, in which the terminal contacts 57 and 65 are connected with the contact 67, for the purpose to be hereinafter more fully described, and in which fluid from the pipe 37 is permitted to vent through the atmospheric opening 116 in the brake valve.

The venting of fluid from pipe 37 causes the emergency piston 32 to be shifted to its outer position by the fluid pressure in valve chamber 33 and the slide valve 35 is thus moved so as to uncover passage 117 and permit the supply of fluid under pressure from the reservoir 12 to the brake cylinder 13.

In emergency position, a port 118 through slide valve 35, registers with passage 96, so that fluid under pressure is supplied to piston 44 of the interlock switch device 11. Said piston is then shifted so as to disconnect the contact member 45 from the spring fingers 46 and 47. In this way the circuit through conductor 55 to the relay coil 54 will be opened. Since in the emergency position of the brake valve device, the circuit of release magnet 41 will be opened, said magnet will be deenergized.

With a manually effected emergency application of the brakes, it may not be desired to open the power circuit and while the circuit to the relay coil 54 is opened at the interlock switch device 11, the circuit to said coil is closed at the brake valve switch 5, since the terminal contacts 57 and 65 engage the contact 67 in the emergency position of the brake valve device 67. In this way, under the above condition, the relay coil 54 is maintained energized in all positions of the brake valve device, since the interlock switch device 11 is maintained closed except when a manual emergency application of the brakes is effected while in the emergency position of the brake valve device, current will be supplied from the conductor 52 to the conductor 55 by contacts 106 and 67.

To release after an emergency application of the brakes, the brake valve device is returned to release position. In this position, the release magnet 41 is energized through the conductor 61.

The release magnet 41 being energized, the valve 43 is unseated and the brake cylinder passage 87 is connected to passage 91. With the emergency slide valve 35 in emergency position, passage 117 leading from the brake cylinder 13, is open to the valve chamber 33, so that fluid under pressure is supplied from the reservoir 12 to passage 87 and thus to passage 91. Passage 91 is connected in emergency position of the slide valve 35, through cavity 92 with passage 30, so that the piston chamber 29 is charged with fluid under pressure through passage 102 leading from passage 30. Since passage 30 leads to pipe 31, said pipe will also be charged with fluid under pressure. When the pressure in chamber 29 has been increased to a predetermined degree, the spring 100 shifts the piston 32 to release position, in which the brake cylinder 13 is connected to the exhaust port 85, as hereinbefore described.

When the emergency slide valve 35 is shifted to release position, piston chamber 95 of the interlock switch device 11 will also be connected to the exhaust port 85, through passage 96, valve cavity 97 and passages 98 and 93, and as the pressure reduces in said piston chamber, the spring 48 shifts the piston 44 to the release position, in which position the circuit through conductors 63 and 64 from circuit A to circuit B is again closed.

As long as the operator holds the controller handle 18 down in the position shown in the drawing, the operation will be the same as that of the usual controller and the circuit through the power circuit control device 14 will be closed.

If, when the brake valve device 6 is in any position except its emergency position, the operator releases the handle 18, the spring 26 will immediately act to shift the plunger 25 downwardly, thereby causing the bell crank lever 19 to open the pilot valve 22.

With the pilot valve 22 unseated, the fluid under pressure in piston chamber 29 is vented to the atmosphere through passage 30, pipe 31, pilot valve chamber 36, and from thence through passage 103 to exhaust port 104.

The venting of fluid from the piston chamber 29 causes the emergency piston 32 to be shifted to its outer position by the fluid pressure in valve chamber 33 and the slide valve 35 is thus moved so as to uncover passage 117 and permit the supply of fluid under pressure from the reservoir 12 to the brake cylinder 13, thereby effecting an application of the brakes.

With the piston 32 in emergency position, chamber 95 of the interlock switch device 11 will be supplied with fluid under pressure in the manner hereinbefore described, and therefore piston 44 will be shifted so as to disconnect the contact member 45 from the spring fingers 46 and 47, and thus open the circuit to the relay coil 54 of the power circuit control device 14.

With the relay coil 54 thus deenergized, the switch member 53 is disengaged from the switch contacts 72 and 74, thereby opening the circuit to the circuit breaker operating coil 51, and causing said coil to be deenergized.

Deenergization of the coil 51 permits the spring 119 to shift the switch members 50 and 56 out of engagement with the switch contacts 69 and 70, and 80 and 81, respectively, thereby opening the power circuit to the traction motors, as will be readily understood.

According to the present invention, in order to close the circuit through the power circuit control device 14, so as to again have power available at the traction motors, and assuming that the brake valve device 6 is in release position, it is first necessary for the operator to return the controller handle 18 to the "power off" position, and to then depress said controller handle, as shown in the drawing, so as to permit the pilot valve 22 to seat, and thus close the atmospheric vent from the pipe 31.

With the pilot valve 22 seated, and with the emergency slide valve 35 in emergency position, passage 117 leading from the brake cylinder 13, is open to the valve chamber 33, so that fluid under pressure is supplied from the reservoir 12 to passage 87 and thus to passage 91. Passage 91 is connected in emergency position of the slide valve 35, through cavity 92 with passage 102, so that the piston chamber 29 is charged with fluid under pressure through passage 30 leading from passage 102. Since passage 30 leads to pipe 31, said pipe will also be charged with fluid under pressure, as has been previously described. When the pressure in chamber 29 has been increased to a predetermined degree, the spring 100 shifts the piston 32 to release position, in which the brake cylinder is connected to the exhaust port 85.

When the emergency slide valve 35 is shifted to release position, piston chamber 95 of the interlock switch device 11 will also be connected to the exhaust port 85, through passage 96, valve cavity 97 and passages 98 and 93, and as the pressure reduces in said piston chamber, the spring 48 shifts the piston 44 to the release position, in which position the contact member 45 engages the spring fingers 46 and 47, thereby closing the circuit through the conductors 63 and 64, from the circuit A to the circuit B.

Current supplied to the circuit A from the trolley wire 15 will now pass through the conductor 55 to the relay coil 54 and from thence through conductor 78 to the ground 79, thereby energizing said relay coil.

Relay coil 54 now being energized, the switch member 53 is moved into engagement with the terminal contacts 72 and 74, thus closing the circuit through the conductor 73 to the circuit breaker operating coil 51 and thence through the conductor 75 to the terminal 76 of the "power off" position of the controller causing the coil 51 to be energized.

With the circuit breaker operating coil 51 now energized, the switch members 50 and 56 will be moved into engagement with the switch contacts 69 and 70 and 80 and 81 respectively, thereby closing the circuit through the conductor 71 to the controller, and also the circuit through the conductor 83 to the ground 84.

It will be noted that the purpose of the circuit through the switch member 56, from conductor 75 to ground 84, is to provide means for maintaining the circuit breaker operating coil 51 energized during the normal operation of the equipment.

When the controller handle 18 is in "power off" position, the circuit breaker operating coil circuit will lead to the controller terminal 76, which is grounded at 77.

However, when the controller handle 18 is moved to one of the "power on" positions, terminal 76 will be cut out of the circuit, and therefore the circuit will lead through the switch member 56 to ground 84.

On the other hand, in order to restore the parts of the control device 14 to their normal positions, after the circuit A has been opened as the result of a dead man's or controller handle emergency, it is necessary to set the controller handle 18 at "power off" position, so that the ground 77 will be available for completing the circuit from the conductor 52 through coil 51 to the conductor 75. Otherwise it will not be possible to energize the coil 51 so that switch members 50 and 56 will close the circuits controlled respectively thereby.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A device of the class described comprising a power circuit, a controller handle, a circuit breaker, and electric means for operating the circuit breaker to break the power circuit when the operator releases the controller handle when said handle is in a "power on" position, said circuit breaker operating means being operated upon the return of said handle to "power off" position to reset the circuit breaker so as to close the power circuit.

2. A device of the class described comprising a power circuit, a controller handle, a circuit breaker, and electric means for automatically operating the circuit breaker to break the power circuit when the operator releases the controller handle when said handle is in a "power on" position, said circuit breaker operating means being operated upon the return of said handle to "power off" position to reset the circuit breaker so as to close the power circuit.

3. A device of the class described comprising a power circuit, a controller handle, an electrically controlled circuit breaker, and electric means for operating the circuit breaker to break the power circuit when the operator releases the controller handle when said handle is in a "power on" position, said circuit breaker operating means being operated upon the return of said handle to "power off" position to reset the circuit breaker so as to close the power circuit.

4. A device of the class described comprising a power circuit, a controller handle, a circuit breaker, normally energized electrical means for maintaining the circuit breaker closed, and electric means operative when the operator releases the controller handle when said handle is in a "power on" position for deenergizing said electrical means, whereby the circuit breaker is operated to open the power circuit.

5. A device of the class described comprising a power circuit, a controller handle, a circuit breaker, normally energized electrical means for maintaining the circuit breaker closed, and electric means operative when the operator releases the controller handle when said handle is in a "power on" position for deenergizing said electrical means, whereby the circuit breaker is operated to open the power circuit, said electric means being operative when the controller handle is moved to "power off" position to energize said electrical means whereby the circuit breaker is operated to close the power circuit.

6. The combination with an electric circuit having a circuit breaker and a controller handle, of electrically operated means for opening the circuit breaker when the operator releases the controller handle when said handle is in a "power on" position and for closing the circuit breaker when the controller handle is returned to its "power off" position.

7. In a device of the class described, the combination with a power circuit and a controller handle, of electric means for controlling the power circuit whereby said power circuit is opened when the operator releases the controller handle when said handle is in a "power on" position, and electric means for closing the power circuit when the controller handle is returned to its "power off" position.

8. A device of the class described comprising a power circuit, a controller handle, a circuit breaker, and electric means operative only when the controller handle is released by the operator when said handle is in a "power off" position for operating the circuit breaker to break the circuit, and operated only when the controller handle is in "power off" position for operating the circuit breaker to close the power circuit.

9. A device of the class described comprising a power circuit, a controller handle, and a circuit breaker for said power circuit adapted to automatically break the power circuit when the controller handle is released by the operator only while said handle is in a "power on" position and adapted to automatically close the power circuit when the controller handle is moved to "power off" position after the circuit has been opened.

10. In a device of the class described, the combination with a power circuit and a controller handle, of electric means for opening the circuit when the controller handle is released by the operator when said handle is in a "power on" position and for automatically closing the circuit when the controller handle is returned to "power off" position.

11. In a safety car equipment, the combination with a power circuit and a controller handle, of a circuit breaker, and electrically operated means comprising a controlling circuit and an electrically operated switch adapted when opened to operate the circuit breaker to break the power circuit when the operator removes his hand from the controller handle when said handle is in running position.

12. In a safety car equipment, the combination with a power circuit and a controller handle, of a circuit breaker, and means comprising a controlling circuit and an electrically operated switch adapted when opened to operate the circuit breaker to break the power circuit when the operator removes his hand from the controller handle when said handle is in running position and adapted when closed when the controller handle is moved to "power off" position after the circuit has been opened, to operate the circuit breaker to close the power circuit.

13. In a safety car equipment, the combination with a brake cylinder, main reservoir, emergency valve, power circuit, and controller handle, of means for opening the power circuit when the controller handle is released by the operator when said handle is in running position, comprising a switch and electric means controlled by the emergency valve for opening said switch when said valve is actuated and adapted to close said switch when the controller handle is moved to "power off" position after the power circuit is opened.

14. In a safety car equipment, the combination with a power circuit, a controller having a grounded terminal at "power off" position, and a controller handle, of a circuit breaker device having a circuit connection with said terminal when the controller handle is in "power off" position, and a separate ground connection when the controller handle is positioned in other than the "power off" position.

15. A safety car equipment comprising a power circuit, a controller having a grounded terminal, and means for controlling the power circuit comprising a switch, a coil for operating the switch, and electric means in a circuit connection to said controller terminal for controlling the switch operating coil.

16. A safety car equipment comprising a power circuit, a controller having at "power off" position a grounded terminal, and means for controlling the power circuit comprising a switch, and a coil for operating the switch, said coil being connected in a circuit through said controller terminal ground when the controller is in "power off" position and in a circuit through another ground when the controller is positioned in other than the "power off" position.

17. A vehicle power circuit controlling apparatus comprising a switch for controlling the power circuit, an electromagnet for controlling said switch, a power controller for closing the circuit of said magnet in the off position, a second switch for controlling the circuit of said magnet, a second electromagnet for operating said switch, means for effecting an emergency application of the brakes, and means operative upon effecting an emergency application of the brakes for opening the circuit of said second electromagnet.

In testimony whereof I have hereunto set my hand, this 5th day of July, 1929.

JOHN B. GROSSWEGE.